(12) United States Patent
Winter et al.

(10) Patent No.: US 7,307,738 B2
(45) Date of Patent: Dec. 11, 2007

(54) BEAM CATCHER

(75) Inventors: Andreas Winter, Feldkirch (AT); Manfred Ammann, Lauterach (AT); Willi Kaneider, Feldkirch-Tosters (AT)

(73) Assignee: Hilti Aktiengesellschaft, Schaan (LI)

( * ) Notice: Subject to any disclaimer, the term of this patent is extended or adjusted under 35 U.S.C. 154(b) by 613 days.

(21) Appl. No.: 10/858,021

(22) Filed: Jun. 1, 2004

(65) Prior Publication Data

US 2005/0006607 A1 Jan. 13, 2005

(30) Foreign Application Priority Data

Jun. 5, 2003 (DE) ............................... 103 25 416

(51) Int. Cl.
*G01B 11/14* (2006.01)
(52) U.S. Cl. .................................... 356/622; 250/208.2
(58) Field of Classification Search ............... 356/5.11, 356/5.12, 614, 622, 138; 250/214 A, 206.1, 250/206.2, 208.2; 33/286, 290
See application file for complete search history.

(56) References Cited

U.S. PATENT DOCUMENTS

| 3,870,887 | A |   | 3/1975 | Dueker |
| 3,894,230 | A |   | 7/1975 | Rorden |
| 3,972,622 | A | * | 8/1976 | Mason et al. ............... 356/400 |
| 4,025,193 | A | * | 5/1977 | Pond et al. .................. 356/5.1 |
| 4,029,415 | A | * | 6/1977 | Johnson ..................... 356/4.08 |
| 4,730,920 | A | * | 3/1988 | Schlemmer et al. ....... 356/4.08 |
| 4,756,617 | A | * | 7/1988 | Cain et al. ................. 356/4.08 |
| 4,830,489 | A | * | 5/1989 | Cain et al. .................... 356/73 |
| 4,926,036 | A |   | 5/1990 | Maeda |
| 5,009,506 | A |   | 4/1991 | Spies |
| 5,030,840 | A | * | 7/1991 | Sommen .................. 250/559.3 |
| 5,189,484 | A | * | 2/1993 | Koschmann et al. ........ 356/138 |
| 6,598,304 | B2 | * | 7/2003 | Akers .......................... 33/286 |
| 7,012,237 | B1 | * | 3/2006 | Ake ......................... 250/214 A |
| 7,030,361 | B2 | * | 4/2006 | Douglas ................. 250/214 R |
| 7,190,439 | B2 | * | 3/2007 | Burkhart, Jr. .............. 356/4.08 |

FOREIGN PATENT DOCUMENTS

EP 819881 1/1998

OTHER PUBLICATIONS

Search Report of the European Patent Office.

* cited by examiner

*Primary Examiner*—Hoa Q. Pham
(74) *Attorney, Agent, or Firm*—Abelman, Frayne & Schwab

(57) ABSTRACT

A beam catcher (1) for a light beam (2) pulsating in amplitude at a modulation frequency (f) with a photodetector (4) with a plurality of photosensors (6) which are offset in a spatially defined manner relative to a reference point (5), an evaluating circuit (7), and an output device (8). A phase shifter (10) that is sensitive to the modulation frequency (f) is arranged between at least two photosensors (6).

20 Claims, 4 Drawing Sheets

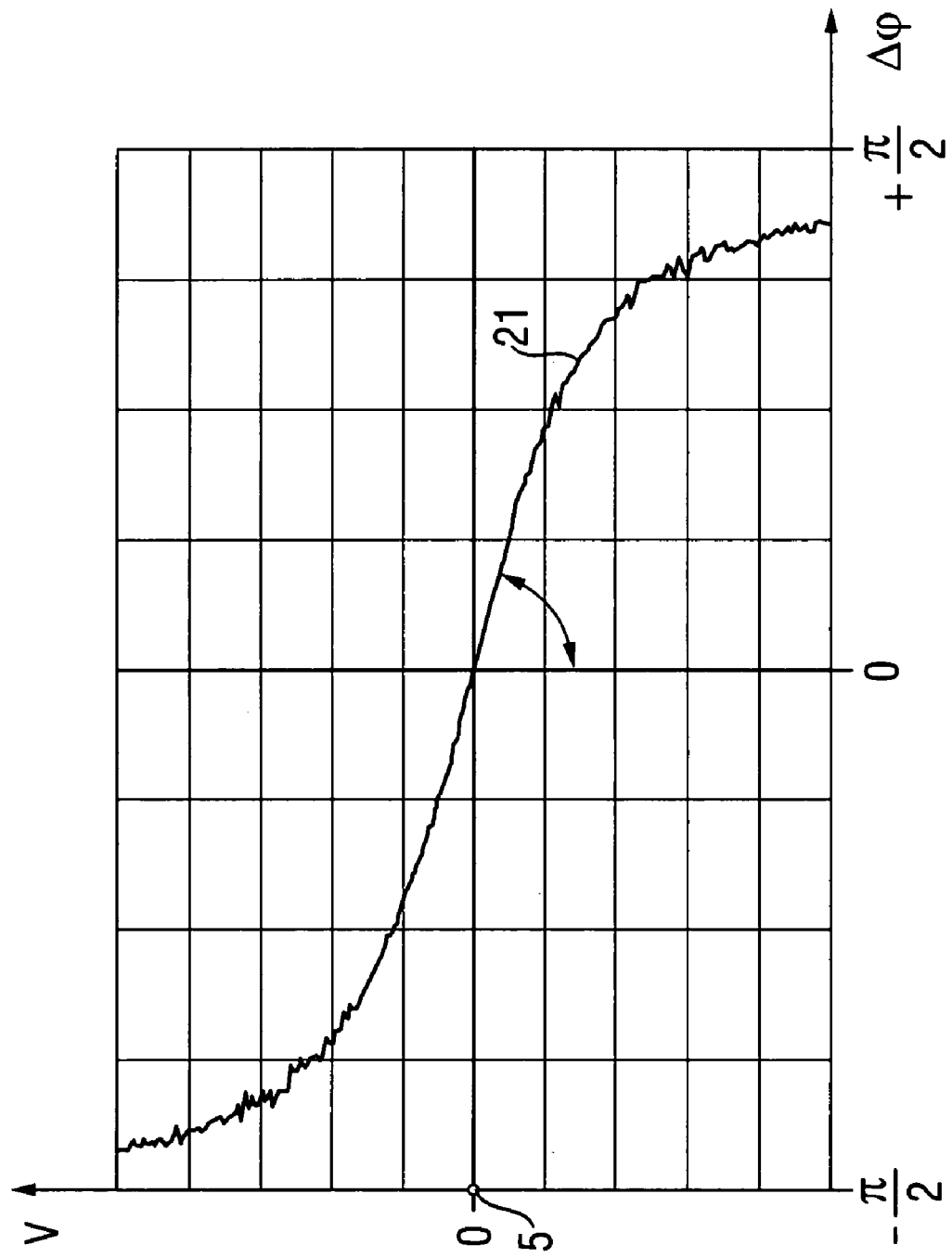

BEAM CATCHER

BACKGROUND OF THE INVENTION

The invention is directed to a beam catcher, particularly for a laser beam of a positioning device.

Positioning devices that emit laser beams for marking are used for positioning tasks in the building industry. Particularly, beam catchers that are associated with the positioning devices are used for reliably finding the beam at greater distances and with poorly reflecting substrates and high requirements for positioning accuracy for exact marking and precise determination of a deviation in position.

In conventional passive beam catchers, auxiliary optics such as wedges or Fresnel lenses are used to convert minimal positional differences in the impinging laser light beam into displays which differ qualitatively. In conventional active beam catchers, a photodetector supplied by a power source is used to receive the laser light beam and a display connected to an evaluating circuit is used to determine the offset of the light beam relative to the reference point.

According to U.S. Pat. No. 3,894,230, an active beam catcher for a pulsating laser has a photodetector with a plurality of photodiodes in the form of a pulse-controlled photodiode array which are offset in a defined manner relative to the reference point along a line, an evaluating circuit, and a digital output of the offset of the light beam relative to the reference point. The associated holding circuit, which is capacitance-coupled to each individual photodiode, responds to light pulses of any type so that extraneous or ambient light and stray light can bring about various interference.

SUMMARY OF THE INVENTION

It is the object of the invention to realize a beam catcher for a pulsating light beam that is not susceptible to interference.

This object is met according to the invention by a beam catcher for a light beam pulsating in amplitude at a modulation frequency substantially having a photodetector with a plurality of photosensors that are offset in a spatially defined manner relative to a reference point, an evaluating circuit, and output device. A phase shifter that is sensitive to the modulation frequency is arranged between at least two photosensors.

The light beam impinging on at least one photosensor causes a mesh current through the frequency-selective phase shifter arranged between two photosensors. This mesh current causes node voltages which are out of phase with one another to occur at the photosensors with the modulation frequency of the light beam. These node voltages can be evaluated by the evaluating circuit in a phase-selective manner. Accordingly, the spatially offset photosensors together with the phase shifter form an offset amplitude phase converter arranged upstream of the evaluating circuit.

The two end points of the phase shifter advantageously have a signal-transmitting connection to a signal input of the evaluating circuit that carries out an evaluation dependent upon phase difference with respect to the signals, which are present at both inputs and which are amplitude-modulated at the modulation frequency of the light beam. Accordingly, this evaluation is highly immune to interference. As a result of an interference-resistant, phase-sensitive evaluation in the evaluating circuit, only pulsating light beams with the associated modulation frequency are detected and, in particular, interfering residual light is suppressed.

A signal amplitude amplifier is advantageously arranged between an end point, preferably between both end points of the phase shifter and the associated signal input of the evaluating circuit so that the sensitivity of the photodetector can be increased.

The signal amplitude amplifier is advantageously frequency-selective for the modulation frequency of the light beam so that the signal-to-noise ratio of the photodetector is increased and this photodetector is sensitive only to a specific given modulation frequency of the light beam. Accordingly, the photodetector is not susceptible to interference with respect to light beams of divergent modulation frequency.

The phase shifter advantageously comprises a network with capacitors, and preferably with inductors, so that a high frequency selectivity of the phase shifter can be achieved with few passive components.

The capacitance C and inductance L are dimensioned in accordance with the equation $LC=(2\pi f)^2$ for a given modulation frequency f, preferably between 100 kHz and 10 MHz, so that a maximum phase displacement occurs when the modulation frequency corresponds to the resonant frequency of the phase shifter.

The capacitors of the phase shifter are advantageously connected to a reference potential to which the photosensors are connected so that a simple asymmetric signal transmission takes place between the individual photosensors and the phase shifter with respect to the reference potential.

The two end points of the phase shifter are advantageously connected to a power source, preferably via a resistor in each instance, so that a virtually constant current flows through the photosensors and a node voltage, which is dependent on the amplitude of the impinging light beam and which is amplitude-modulated at the modulation frequency of the light beam, is present at the photosensors. The phase difference of two node voltages is a measure of the intensity ratio of the light beams impinging at the offset locations of the active photodetector.

A phase shifter chain is advantageously formed between two end points of the phase shifter, its at least two frequency-selective partial phase shifters being arranged between two photosensors in each instance, so that out-of-phase node voltages occur at these partial phase shifters in complex superposition with respect to the end points of the phase shifter chain.

In an advantageous manner, at least three, preferably five, photosensors are offset relative to one another in a spatially equidistant manner along a line as a photosensor array, so that there is a simple functionality, approximately a substantially linearized functionality, with respect to their position in the offset/phase characteristic line.

A phase shifter of the phase shifter chain is advantageously arranged between two photosensors of the photosensor array in each instance, so that there is a substantially linearized functionality with respect to their positions in the photosensor array in the offset/phase characteristic line, which linearized functionality is preferably used for measuring deviations in position.

Alternatively, at least two photosensors which are offset equidistantly along a line are preferably connected in parallel with one another as a photosensor group, so that their branch currents are summed in the same phase and there is a locally reduced dependency with respect to their position in the offset/phase characteristic line.

In an advantageous manner, there are exactly two photosensor groups adjacently offset by the reference point, each photosensor group being connected to an end point of the phase shifter, so that there is a locally increased dependence with respect to the reference point in the offset/phase characteristic line, which dependence can be used for zero point detection in a further advantageous manner.

The plurality of photosensors can advantageously be switched as a photosensor array and as a photosensor group with respect to the phase shifter by a multipole switch, so that the offset/phase characteristic line can be selected in accordance with the intended use.

A light diffuser acting along the line is advantageously associated with the photosensors on the light input side. It is further advantageous that the light diffuser has a half-width that extends along the line within which light diffuser the diffusely scattered intensity integrated along the line is exactly half of the intensity of a bundled light beam which impinges perpendicularly on the light diffuser, and which lies between one half and twice the distance between the discretely spaced photosensors, so that a residual ripple in the offset/phase characteristic line resulting from discretely spaced photosensors is reduced. Accordingly, a large detection area acting along the line can be detected in a substantially linear manner with a few discrete photosensors.

BRIEF DESCRIPTION OF THE DRAWINGS

The invention will be described more fully with reference to the drawings, wherein:

FIG. 5 shows an offset/phase characteristic line according to the invention.

DETAILED DESCRIPTION OF THE DRAWINGS

Figure 1:
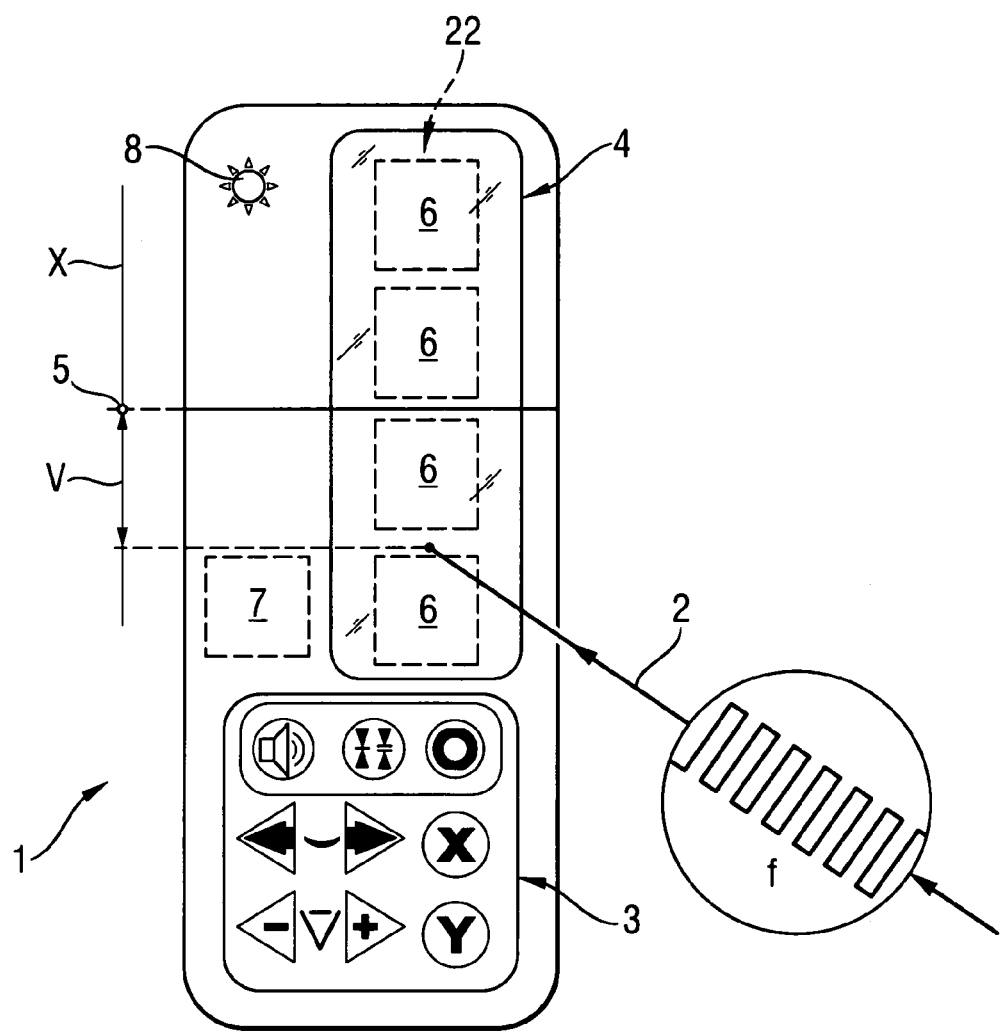
FIG. 1 shows a beam catcher according to the invention.

According to FIG. 1, a hand-held beam catcher 1 for a light beam 2 which pulsates in amplitude with a modulation frequency f and which impinges in a punctiform manner has an input device 3 in the form of a keypad, a photodetector 4 with four photosensors 6 in the form of a photosensor array 22, these photosensors 6 being spatially offset along a line X with respect to a reference point 5, an evaluating circuit 7, and an output device 8 in the form of a light emitting diode which blinks in a controlled manner depending on an offset V of the impinging light beam 2 relative to the reference point 5.

Figure 2:
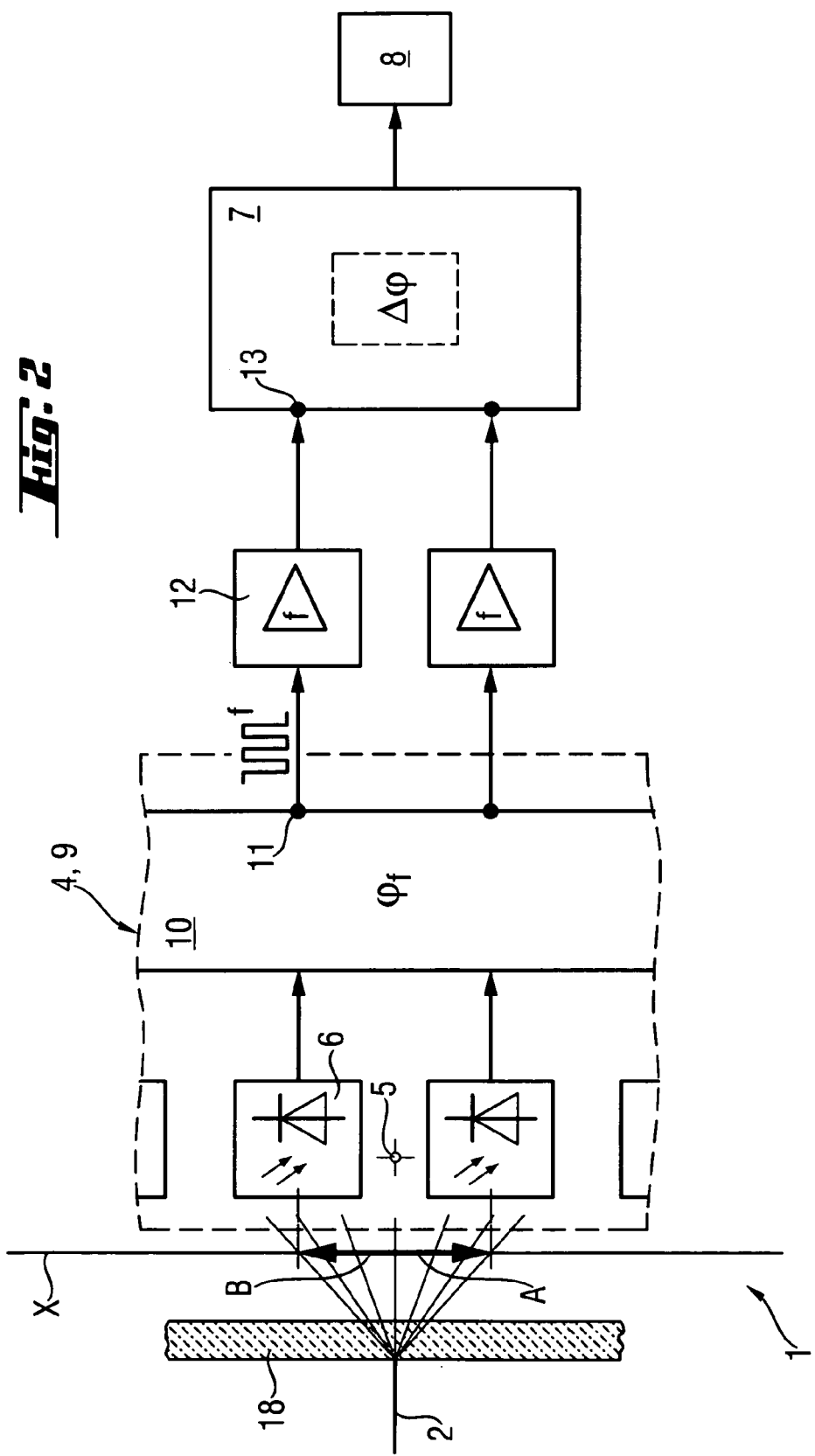
FIG. 2 shows a schematic connection diagram of the beam catcher of FIG. 1.

In the schematic diagram of the beam catcher 1 according to FIG. 2, a light diffuser 18 having a half-width B which extends along line X and corresponds to the distance A between the discretely spaced photosensors 6 is associated with the photosensors 6 which are offset in a spatially defined manner along line X at equal distances A. The photodetector 4 with four photosensors 6 is constructed as an offset amplitude phase converter 9 such that a phase shifter 10, which is sensitive to the modulation frequency f, is arranged between two photosensors 6.

The signals of identical modulation frequency f present at the two end points 11 can be superimposed in a complex manner. The occurring phase difference $\Delta\phi$ is a measure of the intensity ratio of the light beams 2 impinging at offset points along the line X of the photodetector 4. The two end points 11 of the phase shifter 10 are connected in each instance to a signal input 13 of the evaluating circuit 7 by an amplitude-limiting signal amplitude amplifier, which is frequency-selective for modulation frequency f. This evaluation circuit 7 carries out an evaluation by an integrated phase discriminator depending on the phase difference $\Delta\phi$ with respect to the signals, which are present at the two signal inputs 13 and which are amplitude-modulated with the modulation frequency f of the light beam 2 and controls the output device 8 with beating whose zero-beat frequency corresponds to the impingement of the light beam 2 on the reference point 5.

Figure 3:
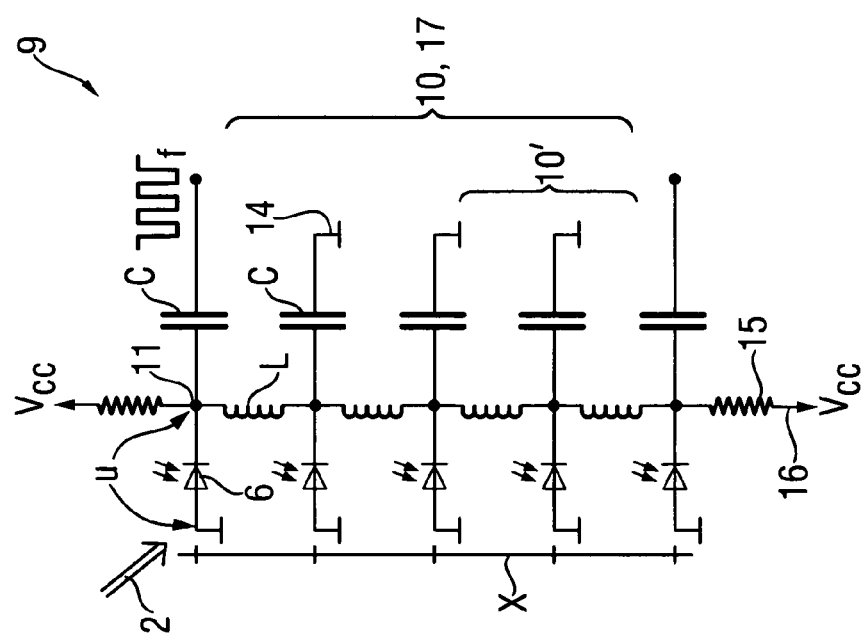
FIG. 3 shows detail of the offset amplitude phase converter according to the invention.

In the offset amplitude phase converter 9 according to FIG. 3, the phase shifter 10 comprises a network with capacitors C and inductors L which are dimensioned corresponding to the resonance condition $LC=(2\pi f)^2$ for a given modulation frequency f of 1 MHz, where $C=4.7$ pF and $L=10$ μH, so that the phase delay is expressed by $T^2=LC$. In the network having a comb-shaped topography, the capacitors C of the phase shifter 10 are connected to a reference potential 14, the photosensors 6 in the form of photodiodes oriented in the blocking direction are also connected to this reference potential 14. The two end points 11 of the phase shifter 10 are connected in each instance by a resistor 15 to a power source 16 in the form of a battery, not shown, with potential $V_{cc}$, wherein the resistance value corresponds to the characteristic impedance of the phase shifter according to $Z^2=L/C$. A node voltage u, which depends on the intensity of the impinging light beam 2, is present across the photosensors 6 and is amplitude-modulated with the modulation frequency f of the light beam 2. A phase shifter chain 17 is formed between the two end points 11 of the phase shifter 10, its three frequency-selective partial phase shifters 10' being arranged in each instance between two photosensors 6, which are arranged adjacently equidistant to one another along line X as a photosensor array 22.

Figure 4:
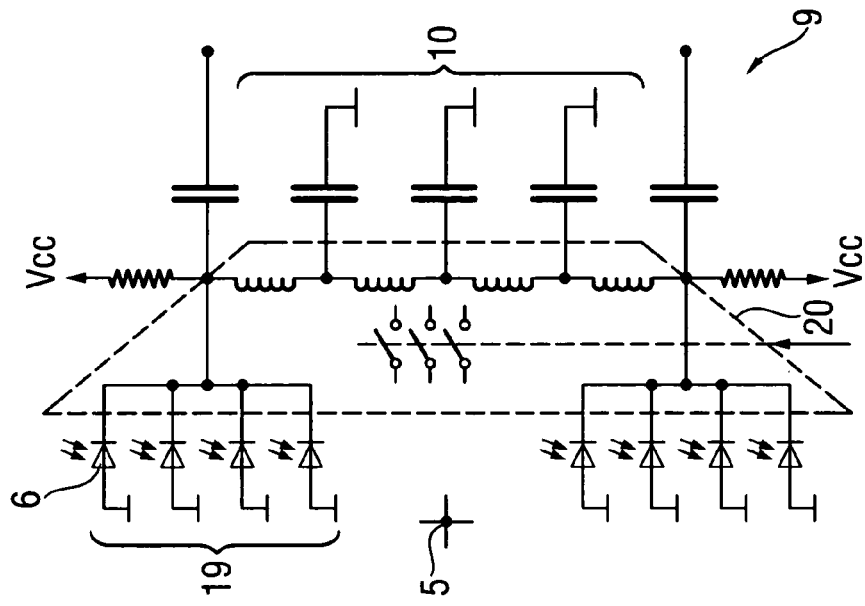
FIG. 4 shows a variant of the detail of the offset amplitude phase converter according to the invention.

According to the alternative offset amplitude phase converter 9 according to FIG. 4, a plurality of parallel-connected photosensors 6 forms a photosensor group 19. As is shown, the individual photosensors 6 are switchable with respect to the phase shifter 10 by a multipole switch 20, shown only schematically, in the form of an electronically controllable analog switch with four photodiodes 6 as exactly two photosensor groups 19 which are adjacently offset by the reference point 5 and also, corresponding to the topology according to FIG. 3, as a photosensor array 22.

In an offset amplitude phase converter of this kind, the offset/phase characteristic line 21 is steepest locally at the reference point 5 according to FIG. 5. Therefore, a slight offset V from the reference point 5 causes a large change in the phase difference $\Delta\phi$.

What is claimed is:

1. A beam catcher for a light beam (2) pulsating in amplitude at a modulation frequency (f) with a photodetector (4) with a plurality of photo sensors (6) that are offset in a spatially defined manner relative to a reference point (5), an evaluating circuit (7), and an output device (8), wherein a phase shifter (10) that is sensitive to the modulation frequency (f) is arranged between at least two of the plurality of photosensors (6);

wherein the phase shifter (10) includes two end points (11) connected to the evaluating circuit (7), which is connected to the output device (8);

wherein the pulsating light beam (2) received by the photosensors (6), depending on an offset (V) relative to the reference point (5), shifts the phase between the two end points (11); and wherein the evaluating circuit (7) derives the offset (V) and controls the output device (8).

2. The beam catcher of claim 1, wherein the two end points (11) of the phase shifter (10) have a signal-transmitting connection to a signal input (13) of the evaluating circuit (7) that is suitably constructed for carrying out an evaluation depending upon a phase difference (Δφ) of the signals that are present at both signal inputs (13) and that are amplitude-modulated at the modulation frequency (f) of the light beam (2).

3. The beam catcher of claim 1, wherein a signal amplitude amplifier (12) is arranged between one of the two end points (11) of the phase shifter (10) and an associated signal input (13) of the evaluating circuit (7).

4. The beam catcher of claim 3, wherein the signal amplitude amplifier (12) is frequency-selective for the modulation frequency (f) of the light beam (2).

5. The beam catcher of claim 1, wherein the phase shifter (10) comprises a network with capacitors (C).

6. The beam catcher of claim 5, wherein the network further comprises inductors (L).

7. The beam catcher of claim 6, wherein the capacitors (C) and inductors (L) are dimensioned in accordance with the formula $LC=(2\pi f)^2$ for a given modulation frequency f.

8. The beam catcher of claim 5, wherein the capacitors (C) of the phase shifter (10) are connected to a reference potential (14) to which the photo sensors (6) are connected.

9. The beam catcher of claim 1, wherein the two end points (11) of the phase shifter (10) are connected to a power source (16).

10. The beam catcher of claim 9, wherein the two end points (11) of the phase shifter (10) are connected to the power source (16) via a resistor (15) in each instance.

11. The beam catcher of claim 1, wherein a phase shifter chain (17) is formed between two end points (11) of the phase shifter (10) with at least two frequency-selective partial phase shifters (10') being arranged between two photosensors (6) in each instance.

12. The beam catcher of claim 1, wherein at least three photosensors (6) are offset relative to one another in a spatially equidistant manner along a line (X) as a photosensor array (22).

13. The beam catcher of claim 12, wherein a partial phase shifter (10') of a phase shifter chain (17) is arranged between two photosensors (6) of the photosensor array (22) in each instance.

14. The beam catcher of claim 12, wherein a light diffuser (18) acting along the line (X) is associated with the photosensors (6) on a light input side.

15. The beam catcher of claim 14, wherein the light diffuser (18) has a half-width (B) that extends along the line (X) and that lies between one half and twice a distance (A) between the discretely spaced photosensors (6).

16. The beam catcher of claim 1, wherein at least two photosensors (6) that are offset equidistantly along a line (X) are connected in parallel with one another as a photosensor group (19).

17. The beam catcher of claim 16, wherein exactly two photosensor groups (19) that are adjacently offset by the reference point (5) are connected to an end point (11) of the phase shifter (10).

18. The beam catcher of claim 16, wherein a multipole switch (20) is arranged between a plurality of photosensors (6) and the phase shifter (10), and wherein the plurality of photosensors (6) can be switched with respect to the phase shifter (10) as a photosensor array (22) and as a photosensor group (19) by the multipole switch (20).

19. The beam catcher of claim 16, wherein a light diffuser (18) acting along the line (X) is associated with the photosensors (6) on a light input side.

20. The beam catcher of claim 1, wherein a signal amplitude amplifier (12) is arranged between both end points (11) of the phase shifter (10) and an associated signal input (13) of the evaluating circuit (7).

* * * * *